US011509466B2

(12) United States Patent
Kajuluri et al.

(10) Patent No.: US 11,509,466 B2
(45) Date of Patent: Nov. 22, 2022

(54) TRANSMISSION OF AUTHENTICATION KEYS

(71) Applicant: Ford Global Technologies, LLC, Dearborn, MI (US)

(72) Inventors: Venkata Kishore Kajuluri, Southgate, MI (US); Xin Ye, Farmington Hills, MI (US); Bradley Warren Smith, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 135 days.

(21) Appl. No.: 17/149,038

(22) Filed: Jan. 14, 2021

(65) Prior Publication Data

US 2022/0224528 A1 Jul. 14, 2022

(51) Int. Cl.
*H04L 9/08* (2006.01)
*H04L 9/32* (2006.01)

(52) U.S. Cl.
CPC .......... *H04L 9/0891* (2013.01); *H04L 9/0819* (2013.01); *H04L 9/3242* (2013.01)

(58) Field of Classification Search
CPC .... H04L 9/0891; H04L 9/0819; H04L 9/3242
See application file for complete search history.

(56) References Cited

U.S. PATENT DOCUMENTS

| 7,602,915 | B2 | 10/2009 | Iwamura |
| 2011/0093930 | A1* | 4/2011 | Bartel-Kurz ............ G06F 21/10 726/4 |
| 2018/0121634 | A1* | 5/2018 | Hughes .................. H04L 63/02 |
| 2019/0068361 | A1 | 2/2019 | Ye et al. |
| 2019/0238555 | A1 | 8/2019 | Buffard et al. |
| 2020/0084025 | A1 | 3/2020 | Ujiie et al. |
| 2020/0162922 | A1* | 5/2020 | Kang .................. H04W 12/106 |

* cited by examiner

*Primary Examiner* — Techane Gergiso
(74) *Attorney, Agent, or Firm* — Brandon Hicks; Bejin Bieneman PLC

(57) ABSTRACT

A computer includes a processor and a memory storing instructions executable by the processor to, upon receiving an authorization message, transmit a plurality of new authentication keys to a respective plurality of control modules, the memory including an expiration time for the authorization message; update a listing of the control modules with respective statuses of the transmissions of the respective new authentication keys to the respective control modules, wherein each status is one of successful or unsuccessful; upon at least one status being unsuccessful, prevent the authorization message from expiring at the expiration time; after preventing the authorization message from expiring, retransmit the respective new authentication keys to each control module for which the respective status is unsuccessful; and then expire the authorization message.

20 Claims, 4 Drawing Sheets

TRANSMISSION OF AUTHENTICATION KEYS

BACKGROUND

Symmetric-key algorithms are cryptographic algorithms using the same cryptographic keys for encrypting unencrypted data and for decrypting encrypted data. Symmetric-key algorithms can use stream ciphers or block ciphers. Stream ciphers encrypt characters of a message one by one. Block ciphers encrypt a block of bits while padding the plaintext. An example of block ciphering is the Advanced Encryption Standard algorithm promulgated by the National Institute of Standards and Technology.

DETAILED DESCRIPTION

Figure 1:
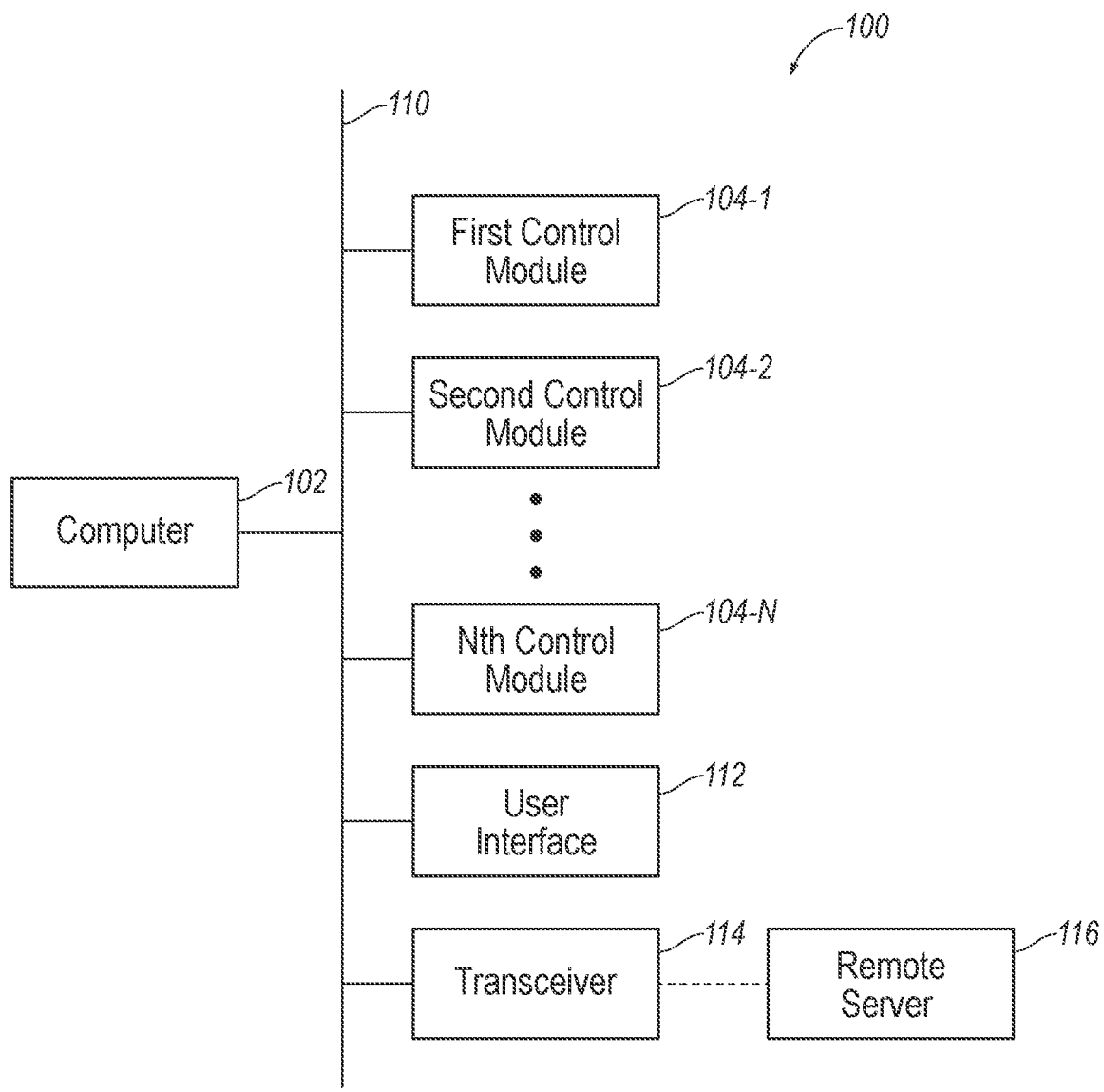
FIG. 1 is a block diagram of an example vehicle.

A computer includes a processor and a memory storing instructions executable by the processor to upon receiving an authorization message, transmit a plurality of new authentication keys to a respective plurality of control modules, the memory including an expiration time for the authorization message; update a listing of the control modules with respective statuses of the transmissions of the respective new authentication keys to the respective control modules, wherein each status is one of successful or unsuccessful; upon at least one status being unsuccessful, prevent the authorization message from expiring at the expiration time; after preventing the authorization message from expiring, retransmit the respective new authentication keys to each control module for which the respective status is unsuccessful; and then expire the authorization message.

The instructions may include instructions to output an error notification to an operator upon at least one status being unsuccessful. The error notification may identify each control module for which the respective status is unsuccessful.

The instructions may include instructions to, after the retransmission, update the respective statuses for each control module for which the respective new authentication key was retransmitted.

The instructions may include instructions to determine whether each status is successful or unsuccessful based on receiving a success notification from the respective control module within a time threshold from transmitting the respective new authentication key to that control module.

The instructions may include instructions to prevent the transmission of the new authentication keys except between reception of the authorization message and expiration of the authorization message.

The table may include, for the respective control modules, respective network addresses of the respective control modules, the respective statuses, and respective counters, and each counter may indicate a number of different new authentication keys that the respective control module has received. The table may include, for the respective control modules, respective key identifiers for the respective new authentication keys transmitted to the respective control modules. The instructions may include instructions to output a summary table to an operator after updating the table, the summary table may include the respective network addresses of the respective control modules and the respective statuses, and the summary table may lack the respective key identifiers.

A system includes a plurality of control modules, a computer, and a wired communication network connecting the computer and the control modules. The computer is programmed to, upon receiving an authorization message, transmit a plurality of new authentication keys to the respective control modules, wherein the computer is storing an expiration time for the authorization message; update a table listing the control modules with respective statuses of the transmissions of the respective new authentication keys to the respective control modules, wherein each status is one of successful or unsuccessful; upon at least one status being unsuccessful, prevent the authorization message from expiring at the expiration time; after preventing the authorization message from expiring, retransmit the respective new authentication keys to each control module for which the respective status is unsuccessful; and then expire the authorization message.

The computer may be further programmed to receive the authorization message from a server remote from the wired communication network.

The computer may be further programmed to output an error notification to an operator upon at least one status being unsuccessful. The error notification may identify each control module for which the respective status is unsuccessful.

The computer may be further programmed to, after the retransmission, update the respective statuses for each control module for which the respective new authentication key was retransmitted.

The control modules may be programmed to transmit a success notification to the computer upon receiving the respective new authentication key, and the computer may be further programmed to determine whether each status is successful or unsuccessful based on receiving a success notification from the respective control module within a time threshold from transmitting the respective new authentication key to that control module.

The computer may be further programmed to prevent the transmission of the new authentication keys except between reception of the authorization message and expiration of the authorization message.

The table may include, for the respective control modules, respective network addresses of the respective control modules, the respective statuses, and respective counters, and each counter may indicate a number of different new authentication keys that the respective control module has received. The table may include, for the respective control modules, respective key identifiers for the respective new authentication keys transmitted to the respective control modules.

Each control module may be programmed to update a local table upon receiving the respective new authentication key, the local table may include a key identifier for the respective new authentication key received by that control module, the status for that control module, and a counter, and the counter may indicate a number of different new authentication keys that that control module has received.

A method includes, upon receiving an authorization message, transmitting a plurality of new authentication keys to a respective plurality of control modules; updating a table listing the control modules with respective statuses of the transmissions of the respective new authentication keys to the respective control modules, wherein each status is one of successful or unsuccessful; upon at least one status being unsuccessful, preventing the authorization message from expiring at an expiration time of the authorization message; after preventing the authorization message from expiring, retransmitting the respective new authentication keys to each control module for which the respective status is unsuccessful; and then expiring the authorization message.

With reference to the Figures, a vehicle 100 includes a computer 102 and a plurality of control modules 104. Communications between the computer 102 and the control modules 104 and among the control modules 104 are encrypted, e.g., using a symmetric-key algorithm. In a communication in which there is a sender and a receiver from the computer 102 and/or the control modules 104, the sender and the receiver both have the same authentication key stored, which the sender uses to encrypt the communication and the receiver uses to decrypt the communication, which can prevent the contents of the communication being known if the communication is intercepted.

However, if a third party discovers the authentication key, then the third party would be able to understand the contents of an intercepted communication. Thus, distributing the authentication keys must be done in a secure manner An initial distribution of authentication keys can be performed at the time that the vehicle 100 is manufactured. But situations can arise requiring a subsequent distribution of new authentication keys, e.g., one of the control modules 104 is replaced, meaning that the new control module 104 does not have the same authentication key as the computer 102 and cannot exchange encrypted communications with the computer 102 (and/or the other control modules 104).

As described herein, subsequent authorization to distribute authentication keys can be provided for a limited window by a trusted source, e.g., a remote server 116 belonging to a manufacturer of the vehicle 100, and the authorization can be provided only to specific parties, e.g., technicians licensed by the manufacturer. The technician requests the authorization from the remote server 116 so that the remote server 116 can track and control the authorizations. The authorization message granting authorization to the computer 102 to distribute the new authentication keys can expire after a short time to limit the time in which the authentication keys might be accessible. If the authorization expires and the distribution of the new authentication key to one of the control modules 104 was unsuccessful, the technician would have to re-request the authorization from the remote server 116. As described below, the computer 102 can delay the expiration of the authorization when one of the control modules 104 did not receive its new authentication key, obviating the need for a re-request while still keeping the expiration time as short as possible.

The computer 102 in the vehicle 100 includes a processor and a memory storing instructions executable by the processor to, upon receiving an authorization message, transmit a plurality of new authentication keys to the respective plurality of control modules 104, the memory including an expiration time for the authorization message; update a table 106 or the like listing the control modules 104 with respective statuses 108 of the transmissions of the respective new authentication keys to the respective control modules 104, wherein each status 108 is one of successful or unsuccessful; upon at least one status 108 being unsuccessful, prevent the authorization message from expiring at the expiration time; after preventing the authorization message from expiring, retransmit the respective new authentication keys to each control module 104 for which the respective status 108 is unsuccessful; and then expire the authorization message.

The programming of the computer 102 provides distribution of new authentication keys from the computer 102 to the control modules 104, enabling encrypted communication between the computer 102 and the control modules 104 using, e.g., a symmetric-key algorithm. The system provides improved and secure distribution of the new authentication keys because the authorization message can be limited to distribution only when the computer 102 and control modules 104 are in a secure environment, e.g., when the vehicle 100 is at a service center and being worked on by a technician. The authorization message is set to expire, limiting the time scope of when the new authentication keys can be distributed to the control modules 104. Moreover, the system achieves these benefits while helping to ensure that the new authentication keys are successfully distributed by temporarily delaying the expiration time of the authorization message, obviating a need for the technician to re-request the authorization message in the event that one of the initial transmissions of the new authentication keys was unsuccessful.

With reference to FIG. 1, the vehicle 100 may be any suitable type of automobile, e.g., a passenger or commercial automobile such as a sedan, a coupe, a truck, a sport utility, a crossover, a van, a minivan, a taxi, a bus, etc. The vehicle 100, for example, may be autonomous. In other words, the vehicle 100 may be autonomously operated such that the vehicle 100 may be driven without constant attention from a driver, i.e., the vehicle 100 may be self-driving without human input.

The computer 102 is a microprocessor-based computing device, e.g., a generic computing device including a processor and a memory, an electronic controller or the like, a field-programmable gate array (FPGA), an application-specific integrated circuit (ASIC), etc. The computer 102 can thus include a processor, a memory, etc. The memory of the computer 102 can include media for storing instructions executable by the processor as well as for electronically storing data and/or databases, and/or the computer 102 can include structures such as the foregoing by which programming is provided.

The computer 102 may transmit and receive data through a wired communications network 110 such as a controller area network (CAN) bus, Ethernet, Local Interconnect Network (LIN), onboard diagnostics connector (OBD-II), any other type of wired network, or a combination of different types of wired networks. The computer 102 may be communicatively coupled to the control modules 104, a user interface 112, a transceiver 114, and other components via the wired communications network 110.

The control modules 104 are microprocessor-based computing devices, e.g., generic computing devices each including a processor and a memory, electronic controllers or the like, field-programmable gate arrays (FPGA), application-specific integrated circuits (ASIC), etc. Each control module 104 can thus include a processor, a memory, etc. The memory of each control module 104 can include media for storing instructions executable by the processor as well as for electronically storing data and/or databases, and/or each control module 104 can include structures such as the foregoing by which programming is provided. The control modules 104 can operate different systems in the vehicle 100, e.g., a body control module, a powertrain control module, a restraint control module, etc.

The user interface 112 presents information to and receives information from a person interacting with the vehicle 100, e.g., an occupant in the vehicle 100 or a technician servicing the vehicle 100. For example, the user interface 112 may be located, e.g., on an instrument panel in a passenger cabin of the vehicle 100, or wherever may be readily seen by an occupant. The user interface 112 may include dials, digital readouts, screens, speakers, and so on for providing information to the occupant, e.g., human-machine interface (HMI) elements such as are known. The user interface 112 may include buttons, knobs, keypads, microphone, and so on for receiving information from the occupant. For another example, the user interface 112 may be an onboard diagnostics (OBD-II) port for accepting an OBD-II scanner.

The transceiver 114 is adapted to transmit signals wirelessly through any suitable wireless communication protocol, such as Bluetooth®, WiFi, IEEE 802.11a/b/g, other RF (radio frequency) communications, etc. The transceiver 114 may be adapted to communicate with the remote server 116, that is, a server distinct and spaced from the vehicle 100. The transceiver 114 may be one device or may include a separate transmitter and receiver.

In particular, the remote server 116 can be a server dedicated to servicing vehicles such as the vehicle 100. The remote server 116 is remote from the wired communications network 110. The remote server 116 can be the source of the authorization message for distributing the new authentication keys, as described below.

Figure 2:
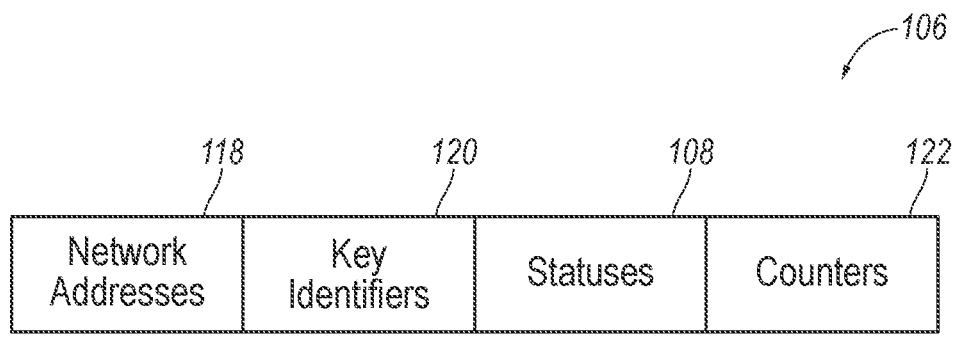
FIG. 2 is a diagram of a table of statuses of authentication keys for control modules of the vehicle.

With reference to FIG. 2, the table 106 is stored in the memory of the computer 102. The table 106 has entries for a plurality of control modules 104 in the vehicle 100. In respective entries for one of the control modules 104, the table 106 can include a network address 118, a key identifier 120, the status 108, and a counter 122. Each network address 118 identifies a location of the respective control module 104 on the wired communications network 110. Each key identifier 120 identifies the new authentication key transmitted to the respective control module 104, so it can be determined whether the computer 102 and the respective control module 104 are using the same authentication key without having to transmit and potentially expose the authentication key. Each status 108 indicates whether the new authentication key was successfully transmitted or not, and each status 108 is one of successful or unsuccessful. Each counter 122 indicates a number of different new authentication keys that the respective control module 104 has received. For example, each counter 122 can have three bits, with 000 (binary 0) representing the factory-installed authentication key, and the counter 122 can cycle through 001 (binary 1) to 111 (binary 7) as new authentication keys are transmitted to the respective control module 104.

Figure 3:
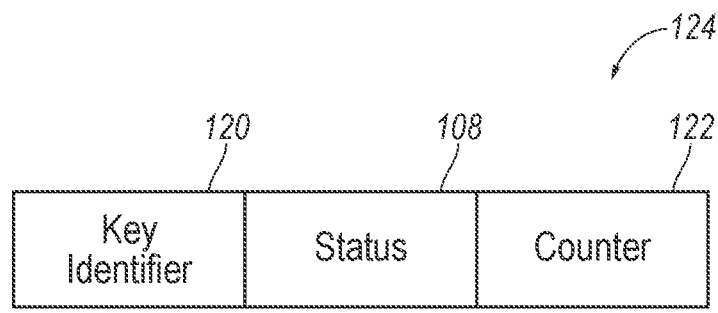
FIG. 3 is a diagram of a table of a status of one of the authentication keys local to one of the control modules.

With reference to FIG. 3, a control module 104 can store a local table 124 in memory. The local table 124 on each control module 104 can include the key identifier 120 for the most recently received new authentication key received by that control module 104, the status 108 for that control module 104, and the counter 122 for that control module 104. The local table 124 can lack the network address 118 and can lack data for the other control modules 104.

Figure 4:
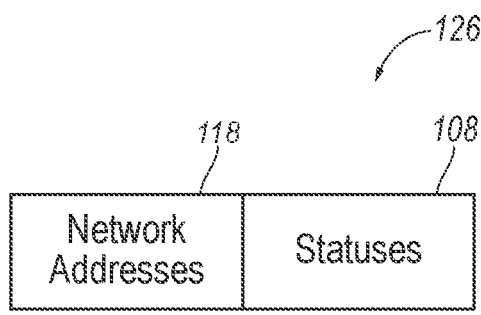
FIG. 4 is a diagram of a summary table of the statuses of the authentication keys for the control modules.

With reference to FIG. 4, the computer 102 can output a summary table 126, e.g., via the user interface 112. The summary table 126 has entries for each control module 104. In each entry for one of the control modules 104, the summary table 126 includes the network address 118 and the status 108 for that control module 104. The summary table 126 lacks the key identifiers 120 and the counters 122.

Figure 5:
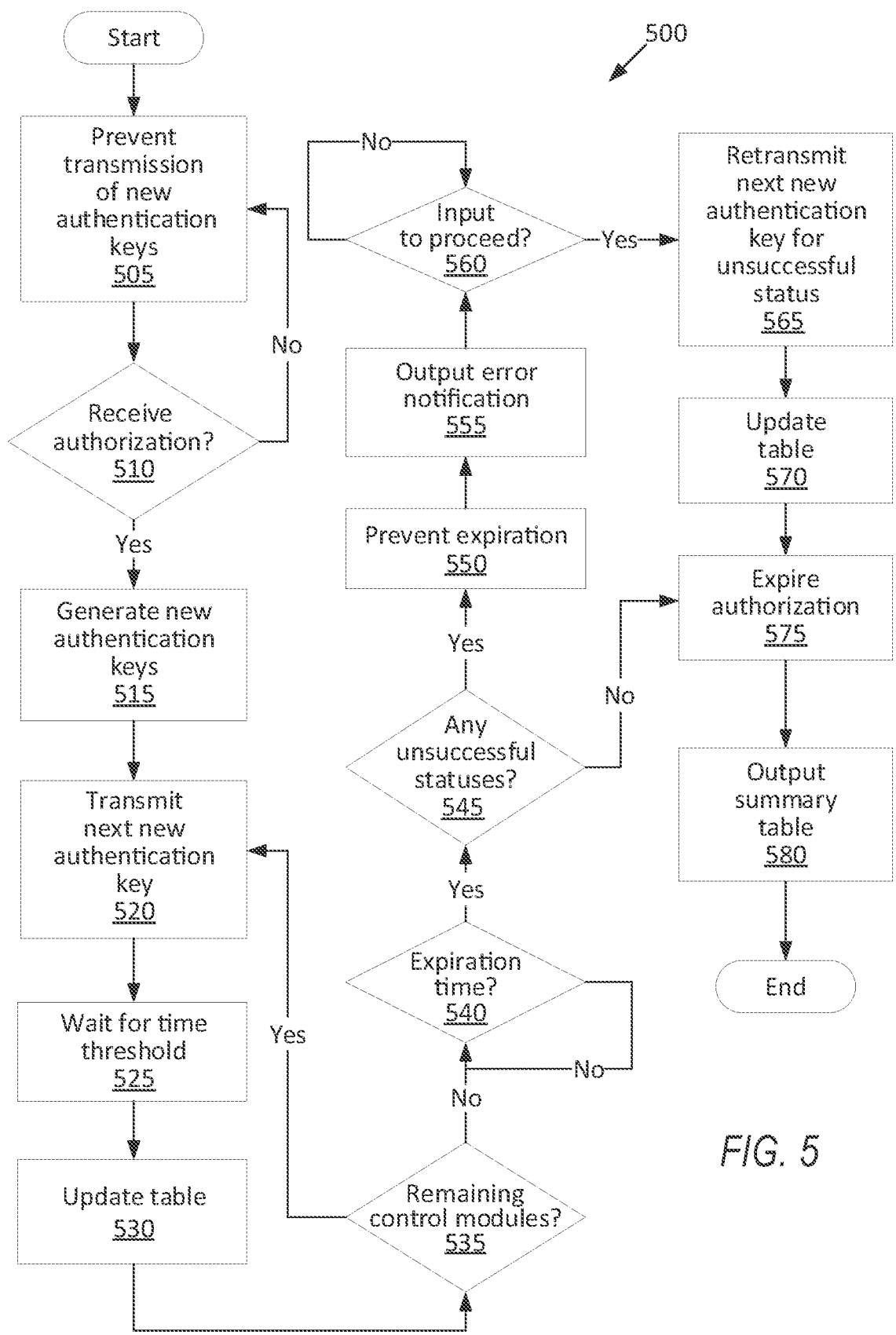
FIG. 5 is a process flow diagram of an example process for updating the authentication keys for the control modules of the vehicle.

FIG. 5 is a process flow diagram illustrating an exemplary process 500 for updating the authentication keys of the control modules 104. The memory of the computer 102 stores executable instructions for performing the steps of the process 500 and/or programming can be implemented in structures such as mentioned above. As a general overview of the process 500, the computer 102 prevents the transmission of the new authentication keys except for a period of time that is the time between reception of the authorization message and expiration of the authorization message. When the computer 102 receives the authorization message, the computer 102 generates the new authentication keys and, for each of a plurality of control modules 104, transmits the respective new authentication key and updates the table 106 based on whether the control modules 104 transmit success notifications indicating reception of the new authentication keys. If any of the statuses 108 are unsuccessful, the computer 102 prevents expiration of the authorization, outputs an error notification, retransmits the new authentication keys to the control modules 104 with unsuccessful statuses 108 upon receiving input to do so (e.g., from a technician), and updates the table 106. Next, or if all the statuses 108 are successful, the computer 102 outputs the summary table 126 and expires the authorization.

The process 500 begins in a block 505, in which the computer 102 prevents the transmission of the new authentication keys because it is not authorized for such transmission. By default, the computer 102 is unauthorized to transmit the new authentication keys. The exception is that the computer 102 is authorized to transmit the new authentication keys between reception of the authorization message and expiration of the authorization message.

Next, in a decision block 510, the computer 102 determines whether the computer 102 has received the authorization message. The authorization message originates from the remote server 116, is received by the transceiver 114, and passed to the computer 102 via the wired communications network 110. The memory of the computer 102 includes an expiration time, i.e., a time until the authorization to transmit the new authentication keys ends. The expiration time can be, e.g., a setting or parameter of the computer 102. Alternatively, the authorization message can include the expiration time. The expiration time is chosen to be short but still sufficiently long for the computer 102 to transmit the new authentication keys to the control modules 104 if the transmissions are all successful, e.g., one minute. If the computer 102 has not received the authorization message, the process 500 returns to the block 505 to continue waiting for the authorization message. If the computer 102 has received the authorization message, the process 500 proceeds to a block 515.

In the block 515, the computer 102 generates the new authentication keys. The computer 102 can use any suitable method for generating the new authentication keys, e.g., a pseudorandom key generator, as is known.

Next, in a block 520, the computer 102 transmits a next new authentication key to a respective next control module 104. The computer 102 can store a list of the control modules 104 in memory. If the computer 102 has not yet transmitted any of the new authentication keys, the computer 102 transmits a first new authentication key of the new authentication keys to a first control module 104-1 on the list of the control modules 104. If the computer 102 has transmitted at least new authentication key, the computer 102 transmits the next new authentication key to the next control module 104 on the list, e.g., to a second control module 104-2 immediately after the first control module 104, up to an Nth control module 104-N out of N total control modules 104.

Next, in a block 525, the computer 102 waits for a time threshold after transmitting the next new authentication key. The time threshold is chosen to be a length of time for the next control module 104 to receive the next new authentication key and respond with a success notification, as described below with respect to a process 600.

Next, in a block 530, the computer 102 updates the table 106 with the status 108 of the transmission of the next authentication key. If the computer 102 received the success notification from the next control module 104 within the time threshold, the respective status 108 is updated as successful, and the counter 122 is incremented. If the computer 102 did not receive the success notification from the next control module 104 within the time threshold, the respective status 108 is updated as unsuccessful.

Next, in a decision block 535, the computer 102 determines whether there are remaining control modules 104 that the computer 102 has not transmitted the respective new authentication key to. If the most recently transmitted new authentication key was transmitted to the Nth control module 104-N out of the N total control modules 104, there are no remaining control modules 104. If the most recently transmitted new authentication key was transmitted to a different control module 104, there are remaining control modules 104. If there is at least one remaining control module 104, the process 500 returns to the block 520 to transmit the next new authentication key. If there are not remaining control modules 104, the process 500 proceeds to a decision block 540.

In the decision block 540, the computer 102 determines whether the expiration time of the authorization message has elapsed. If not, the process 500 returns to the decision block 540; in other words, the process 500 waits until the expiration time elapses. If the expiration time has elapsed, the process 500 proceeds to a decision block 545.

In the decision block 545, the computer 102 determines whether the table 106 includes any unsuccessful statuses 108, i.e., at least one status 108 is unsuccessful. If at least one status 108 is unsuccessful, the process 500 proceeds to a block 550. If all the statuses 108 are successful, the process 500 proceeds to a block 575.

In the block 550, the computer 102 prevents the authorization message from expiring at the expiration time, i.e., despite the fact that the expiration time has elapsed.

Next, in a block 555, the computer 102 outputs an error notification to an operator via the user interface 112. The operator can be, e.g., a technician at a service center. The error notification identifies each control module 104 for which the respective status 108 is unsuccessful. For example, the error notification can be the summary table 126. Alternatively or additionally, the error notification can take the form of a diagnostic trouble code (DTC), with the DTC identifying the control modules 104 with unsuccessful statuses 108.

Next, in a decision block 560, the computer 102 determines whether the computer 102 has received an input from the operator, e.g., via the user interface 112, instructing the computer 102 to proceed to retransmit the new authentication keys to the control modules 104 with unsuccessful statuses 108. The operator may perform some action before providing the input, e.g., replacing the control modules 104 with unsuccessful statuses 108. If the computer 102 has not received the input, the process 500 returns to the block 560; in other words, the process 500 waits until the computer 102 receives the input. Once the computer 102 receives the input, the process 500 proceeds to a block 565.

In the block 565, i.e., after preventing the authorization message from expiring, the computer 102 retransmits the respective new authentication keys to each control module 104 for which the respective status 108 is unsuccessful. For each control module 104, the computer 102 sends the same new authentication key that the computer 102 attempted to transmit to that control module 104 in the block 520 above.

Next, in a block 570, i.e., after the retransmission, the computer 102 updates the respective statuses 108 for each control module 104 for which the respective new authentication key was retransmitted. For each control module 104 from which the computer 102 received the success notification within the time threshold, the computer 102 updates the respective status 108 to successful and increments the respective counter 122. For each control module 104 from which the computer 102 did not receive the success notification within the time threshold, the computer 102 maintains the respective status 108 as unsuccessful. After the block 570, the process 500 proceeds to the block 575.

In the block 575, the computer 102 then expires the authorization message.

Next, in a block 580, the computer 102 outputs the summary table 126 to the operator, e.g., via the user interface 112. After the block 580, the process 500 ends.

Figure 6:
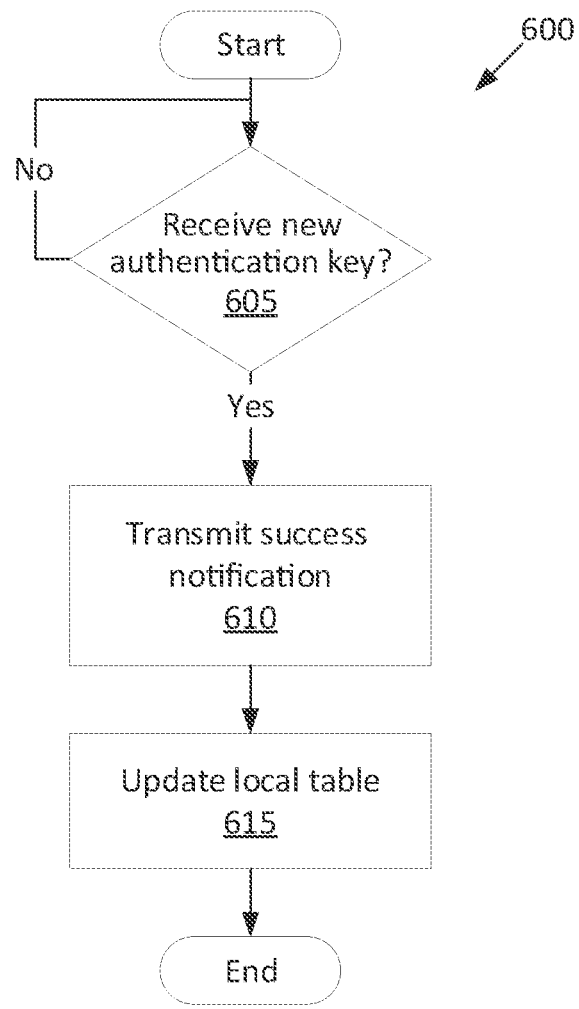
FIG. 6 is a process flow diagram of an example process for responding to a new authentication key by one of the control modules.

FIG. 6 is a process flow diagram illustrating an exemplary process 600 for responding to a new authentication key. The memory of each control module 104 stores executable instructions for performing the steps of the process 600 and/or programming can be implemented in structures such as mentioned above. As a general overview of the process 600, upon receiving the new authentication key, the control module 104 transmits the success notification and updates the local table 124.

The process 600 begins in a decision block 605, in which the control module 104 determines whether the control module 104 has received the respective new authentication key via the wired communications network 110. If the control module 104 has not received the respective new authentication key, the process 600 returns to the decision block 605; in other words, the process 600 waits until the control module 104 receives the respective new authentication key. Once the control module 104 receives the respective new authentication key, the process 600 proceeds to a block 610.

In the block 610, the control module 104 transmits the success notification to the computer 102 via the wired communications network 110.

Next, in a block 615, the control module 104 updates the local table 124. The control module 104 updates the status 108 to successful and increments the counter 122. After the block 615, the process 600 ends.

Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

The disclosure has been described in an illustrative manner, and it is to be understood that the terminology which has been used is intended to be in the nature of words of description rather than of limitation. Use of "in response to" and "upon determining" indicates a causal relationship, not merely a temporal relationship. The adjectives "first" and "second" are used throughout this document as identifiers and are not intended to signify importance, order, or quantity. Many modifications and variations of the present disclosure are possible in light of the above teachings, and the disclosure may be practiced otherwise than as specifically described.

The invention claimed is:

1. A computer comprising a processor and a memory storing instructions executable by the processor to:
    upon receiving an authorization message, transmit a plurality of new authentication keys to a respective plurality of control modules, the memory including an expiration time for the authorization message;
    update a table of the control modules with respective statuses of the transmissions of the respective new authentication keys to the respective control modules, wherein each status is one of successful or unsuccessful;
    upon at least one status being unsuccessful, prevent the authorization message from expiring at the expiration time;
    after preventing the authorization message from expiring, retransmit the respective new authentication keys to each control module for which the respective status is unsuccessful; and
    then expire the authorization message.

2. The computer of claim 1, wherein the instructions include instructions to output an error notification to an operator upon at least one status being unsuccessful.

3. The computer of claim 2, wherein the error notification identifies each control module for which the respective status is unsuccessful.

4. The computer of claim 1, wherein the instructions include instructions to, after the retransmission, update the respective statuses for each control module for which the respective new authentication key was retransmitted.

5. The computer of claim 1, wherein the instructions include instructions to determine whether each status is successful or unsuccessful based on receiving a success notification from the respective control module within a time threshold from transmitting the respective new authentication key to that control module.

6. The computer of claim 1, wherein the instructions include instructions to prevent the transmission of the new authentication keys except between reception of the authorization message and expiration of the authorization message.

7. The computer of claim 1, wherein the table includes, for the respective control modules, respective network addresses of the respective control modules, the respective statuses, and respective counters, wherein each counter indicates a number of different new authentication keys that the respective control module has received.

8. The computer of claim 1, wherein the table includes, for the respective control modules, respective key identifiers for the respective new authentication keys transmitted to the respective control modules.

9. The computer of claim 8, wherein the instructions include instructions to output a summary table to an operator after updating the table, the summary table includes the respective network addresses of the respective control modules and the respective statuses, and the summary table lacks the respective key identifiers.

10. A system comprising:
    a plurality of control modules;
    a computer; and
    a wired communication network connecting the computer and the control modules;
    wherein the computer is programmed to:
    upon receiving an authorization message, transmit a plurality of new authentication keys to the respective control modules, wherein the computer is storing an expiration time for the authorization message;
    update a table of the control modules with respective statuses of the transmissions of the respective new authentication keys to the respective control modules, wherein each status is one of successful or unsuccessful;
    upon at least one status being unsuccessful, prevent the authorization message from expiring at the expiration time;
    after preventing the authorization message from expiring, retransmit the respective new authentication keys to each control module for which the respective status is unsuccessful; and
    then expire the authorization message.

11. The system of claim 10, wherein the computer is further programmed to receive the authorization message from a server remote from the wired communication network.

12. The system of claim 10, wherein the computer is further programmed to output an error notification to an operator upon at least one status being unsuccessful.

13. The system of claim 12, wherein the error notification identifies each control module for which the respective status is unsuccessful.

14. The system of claim 10, wherein the computer is further programmed to, after the retransmission, update the respective statuses for each control module for which the respective new authentication key was retransmitted.

15. The system of claim 10, wherein the control modules are programmed to transmit a success notification to the computer upon receiving the respective new authentication key, and the computer is further programmed to determine whether each status is successful or unsuccessful based on receiving a success notification from the respective control module within a time threshold from transmitting the respective new authentication key to that control module.

16. The system of claim 10, wherein the computer is further programmed to prevent the transmission of the new authentication keys except between reception of the authorization message and expiration of the authorization message.

17. The system of claim 10, wherein the table includes, for the respective control modules, respective network addresses of the respective control modules, the respective statuses, and respective counters, wherein each counter indicates a number of different new authentication keys that the respective control module has received.

18. The system of claim 10, wherein the table includes, for the respective control modules, respective key identifiers for the respective new authentication keys transmitted to the respective control modules.

19. The system of claim 10, wherein each control module is programmed to update a local table upon receiving the respective new authentication key, the local table includes a key identifier for the respective new authentication key received by that control module, the status for that control module, and a counter, and the counter indicates a number of different new authentication keys that that control module has received.

20. A method comprising:
upon receiving an authorization message, transmitting a plurality of new authentication keys to a respective plurality of control modules;
updating a table of the control modules with respective statuses of the transmissions of the respective new authentication keys to the respective control modules, wherein each status is one of successful or unsuccessful;
upon at least one status being unsuccessful, preventing the authorization message from expiring at an expiration time of the authorization message;
after preventing the authorization message from expiring, retransmitting the respective new authentication keys to each control module for which the respective status is unsuccessful; and
then expiring the authorization message.

\* \* \* \* \*